United States Patent
Clark et al.

(10) Patent No.: US 9,843,584 B2
(45) Date of Patent: Dec. 12, 2017

(54) PROTECTING PRIVACY IN AN ONLINE SETTING

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 14/872,954

(22) Filed: Oct. 1, 2015

(65) Prior Publication Data

US 2017/0099291 A1    Apr. 6, 2017

(51) Int. Cl.
| | |
|---|---|
| *G06F 21/60* | (2013.01) |
| *H04L 29/06* | (2006.01) |
| *G06F 17/30* | (2006.01) |
| *G06F 21/62* | (2013.01) |

(52) U.S. Cl.
CPC .......... *H04L 63/10* (2013.01); *G06F 17/3053* (2013.01); *G06F 17/30867* (2013.01); *G06F 21/6254* (2013.01); *H04L 63/126* (2013.01); *G06F 21/6245* (2013.01)

(58) Field of Classification Search
None
See application file for complete search history.

(56) References Cited

U.S. PATENT DOCUMENTS

| | | | |
|---|---|---|---|
| 8,468,244 B2 | 6/2013 | Redlich et al. | |
| 8,706,739 B1 | 4/2014 | Song et al. | |
| 8,925,099 B1 * | 12/2014 | Saxe ............... | G06F 21/577 713/187 |
| 9,380,128 B2 * | 6/2016 | Kanter ............. | H04L 67/306 |

(Continued)

OTHER PUBLICATIONS

Claub, Sebastian; "A Framework for Quantification of Linkability Within a Privacy-Enhancing Identity Management System"; 2006; LNCS 3995; Retrieved from the Internet <URL: http://link.springer.com/chapter/10.1007%2F11766155_14>; pp. 1-15 as printed.*

(Continued)

*Primary Examiner* — Saleh Najjar
*Assistant Examiner* — Michael Chao
(74) *Attorney, Agent, or Firm* — Patterson + Sheridan, LLP

(57) ABSTRACT

Systems, methods, and computer program products to perform an operation comprising receiving digital content associated with an account identifier, parsing the digital content and extracting a set of attributes from the digital content, receiving via a network connection, from each of a plurality of online identity services, a set of identities matching at least one attribute of the set of attributes, intersecting the sets of identities to create a set of candidate identities, computing a score for each identity in the set of candidate identities, wherein each score reflects a likelihood that the respective candidate identity is associated with the account identifier; and returning a ranked list of the scored candidate identities and an indication of at least one item of evidence linking the respective candidate identity to the account identifier.

20 Claims, 9 Drawing Sheets

(56) References Cited

U.S. PATENT DOCUMENTS

| | | | |
|---|---|---|---|
| 2004/0199781 | A1 | 10/2004 | Erickson et al. |
| 2006/0123462 | A1* | 6/2006 | Lunt .................. H04L 63/0421 726/1 |
| 2011/0029566 | A1* | 2/2011 | Grandison ............ G06Q 50/01 707/783 |
| 2011/0178943 | A1* | 7/2011 | Motahari ........... G06F 21/6254 705/325 |
| 2011/0258206 | A1* | 10/2011 | El Emam ............. G06F 21/577 707/754 |
| 2011/0289590 | A1* | 11/2011 | Miettinen ............. G06Q 30/02 726/26 |
| 2014/0304343 | A1 | 10/2014 | Skiba et al. |
| 2015/0067883 | A1* | 3/2015 | Shen .................. G06F 21/6254 726/27 |

OTHER PUBLICATIONS

Cortis et al.; "An Ontology-Based Tchnique for Online Profile Resolution"; 2013; LNCS 8238; Retrieved from the Internet <URL: http://link.springer.com/chapter/10.1007/978-3-319-03260-3_25>; pp. 1-15 as printed.*

LeFevre et al.; "Incognito: Efficient Full-Domain K-Anonymity"; 2005; Retrieved from the Internet <URL: http://dl.acm.org/citation.cfm?id=1066164>; pp. 1-12 as printed.*

Thiel et al.; "Unlinkability Support in a Decentralised, Multiple-identity Social Network"; 2013; Retrieved from the Internet <URL: http://cs.emis.de/LNI/Proceedings/Proceedings223/32.pdf>; pp. 1-11 as printed.*

Paul Ohm, "Broken Promises of Privacy: Responding to the Surprising Failure of Anonymization", UCLA Law Review, vol. 57, pp. 1701-1777, 2010, U of Colorado Law Legal Studies Research Paper No. 9-12. <http://papers.ssrn.com/sol3/papers.cfm?abstract_id=1450006>.

Jenni Ryall, "Game reviewer received rape threats from boys, contacted their mothers", Dec. 1, 2014, retrieved Sep. 24, 2015, 4 pages. <http://mashable.com/2014/12/01/rape-threats-contact-mothers/>.

* cited by examiner

Provide user ID: SMARTGIRL    Submit

RESULTS OF ONLINE SECURITY CHECK

The user ID SMARTGIRL can be associated with over 5,000 people. Your online security/privacy level remains high. Here are the top 5 results with supporting evidence (hover over evidence for more detail):

1. L. Simpson    (hometown, education history, siblings)
2. Lisa S.       (hometown, education history, siblings)
3. Jane Doe      (gender, hometown, education history)
4. Janet Doe     (gender, marital status, number of siblings)
5. Maggie S.     (gender, number of siblings)

PROTECTING PRIVACY IN AN ONLINE SETTING

BACKGROUND

The present invention relates to computer software, and more specifically, to protecting privacy in an online setting.

Maintaining privacy is difficult when personal information is shared online. While often harmless, sharing personal information on an online platform may pose risks to personal privacy and safety. Many types of data, in isolation, lend little to divulging an online account holder's real-world identity. However, seemingly innocent data points, when used in combination, may uniquely identify a person. For example, research has shown that a significant number of Americans can be uniquely identified by a combination of their birth date, zip code, and gender. Certain groups of users, such as children, are especially at risk when their personal privacy is compromised. These risks remain even though users may post information online through an alias—such as an email address, account name/login, and the like—rather than under their real names. Therefore, there is a need to protect personal privacy in online settings.

SUMMARY

Embodiments disclosed herein provide systems, methods, and computer program products to perform an operation comprising receiving digital content associated with an account identifier, parsing the digital content and extracting a set of attributes from the digital content, receiving via a network connection, from each of a plurality of online identity services, a set of identities matching at least one attribute of the set of attributes, intersecting the sets of identities to create a set of candidate identities, computing a score for each identity in the set of candidate identities, wherein each score reflects a likelihood that the respective candidate identity is associated with the account identifier; and returning a ranked list of the scored candidate identities and an indication of at least one item of evidence linking the respective candidate identity to the account identifier.

BRIEF DESCRIPTION OF THE SEVERAL VIEWS OF THE DRAWINGS

FIGS. 1A-1C illustrate techniques to protect privacy in an online setting, according to one embodiment.

DETAILED DESCRIPTION

Figure 2:
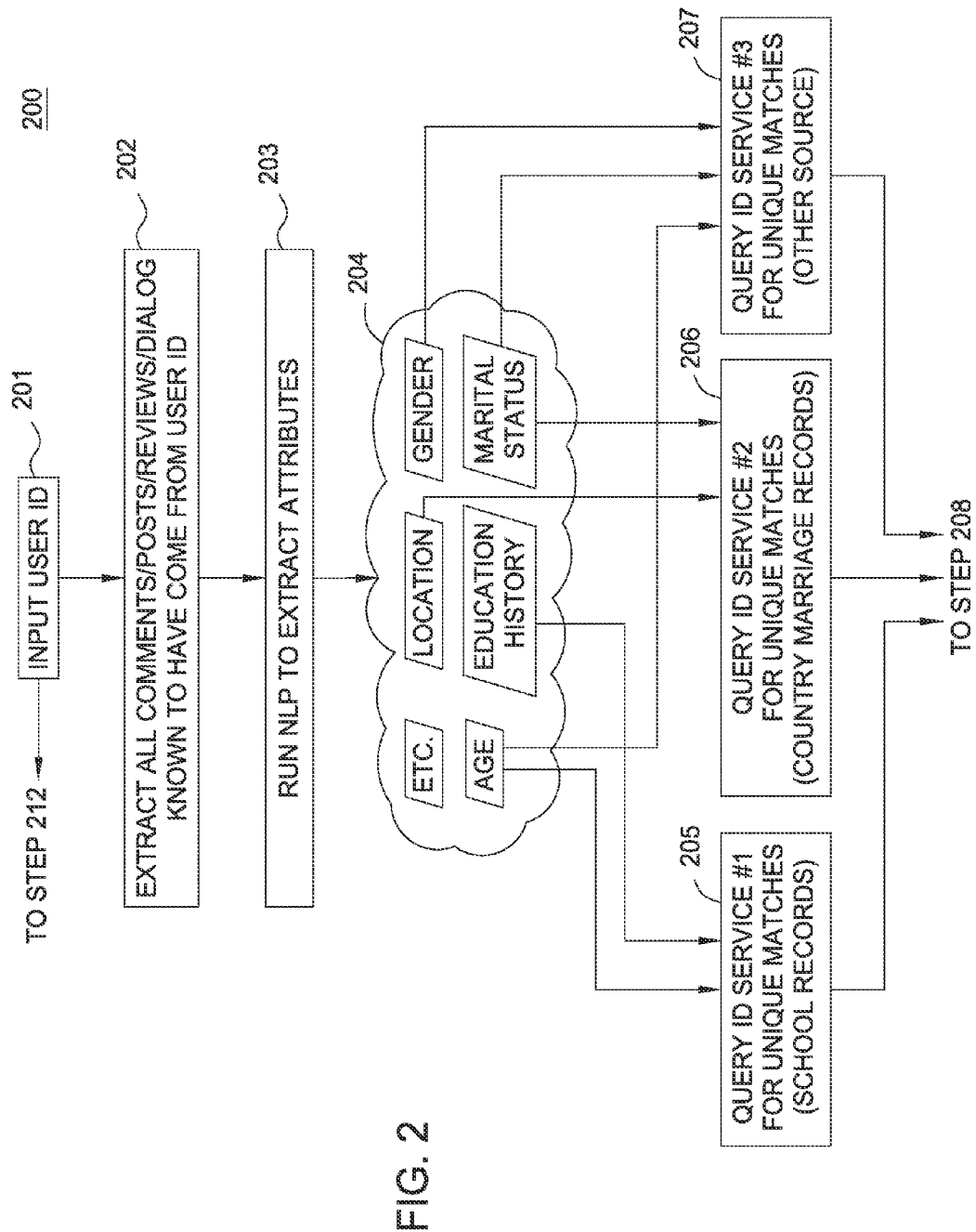
FIG. 2 is a diagram illustrating techniques to protect privacy in an online setting, according to one embodiment.
Figure 2:
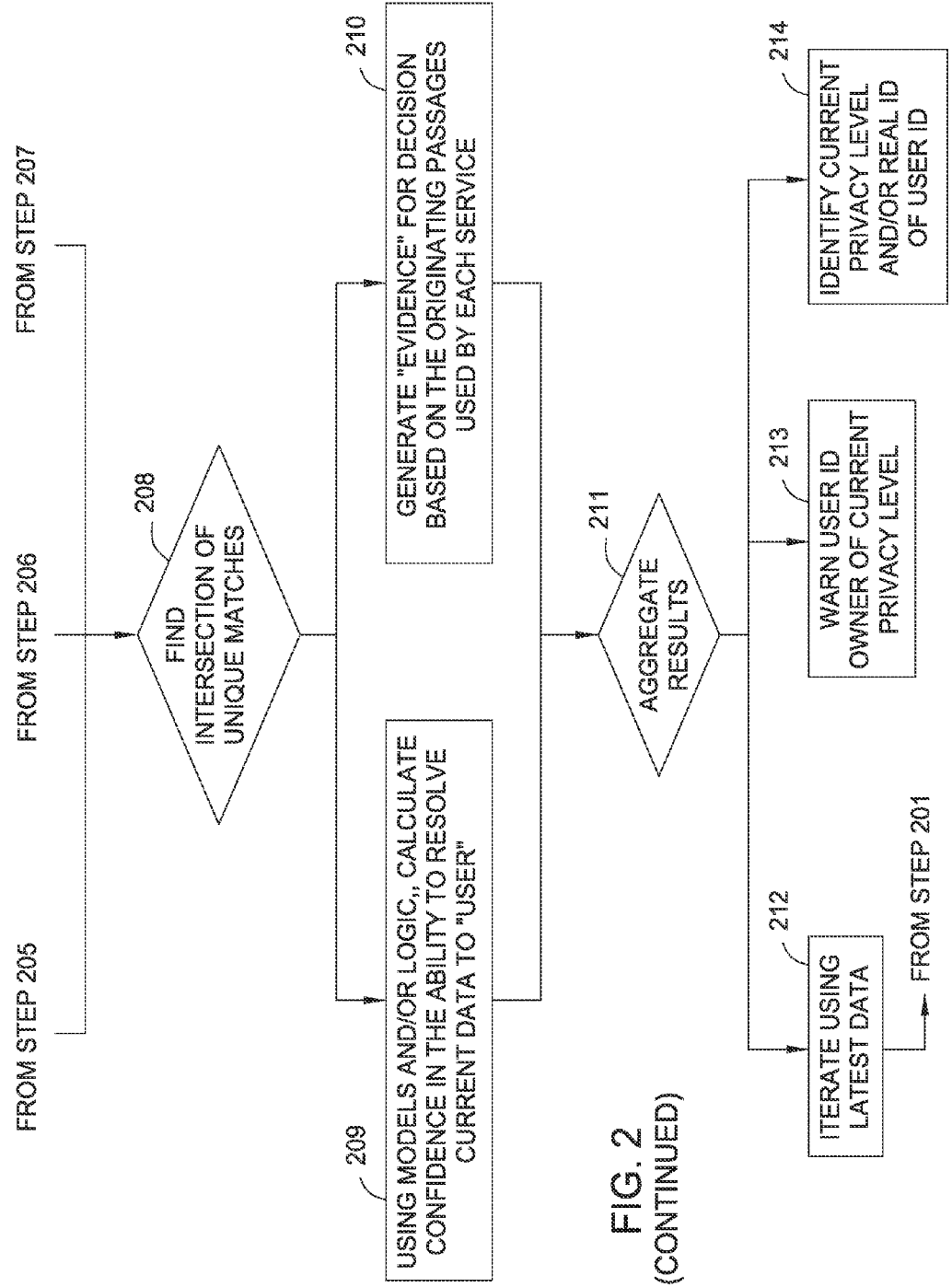

Embodiments disclosed herein provide techniques to protect privacy in an online setting. In at least one embodiment, a privacy manager may monitor content users intend to publish via an online account, and issue warnings when the content includes information that may be used to identify the person behind the online account to a degree of certainty. In some embodiments, the privacy manager may restrict publication of such content, modify the content, or otherwise alert the user to the risks posed by publishing the content.

For example, online video games often allow users to chat amongst each other in text-based chat rooms. The users may have a unique username, which often does not correspond to their real name. The messages users post in these chat rooms may often be observed not only by their friends, but by any number of other unknown people. For example, a child playing a video game may be unknowingly divulging information that can identify the child, exposing the child to different types of threats to their safety. If the privacy manager determines that the child is composing a message that would uniquely identify the child (or limit the number of total possible matches to a handful of people), the privacy manager may prevent the child from submitting the message to the chat room. The privacy manager may also edit the message to remove those features that are especially relevant in compromising the user's anonymity, such as their home address. Further still, the privacy manager may add features to the message that may significantly increase the number of real-life people that the message can be attributed to.

Figures 1A, 1B:
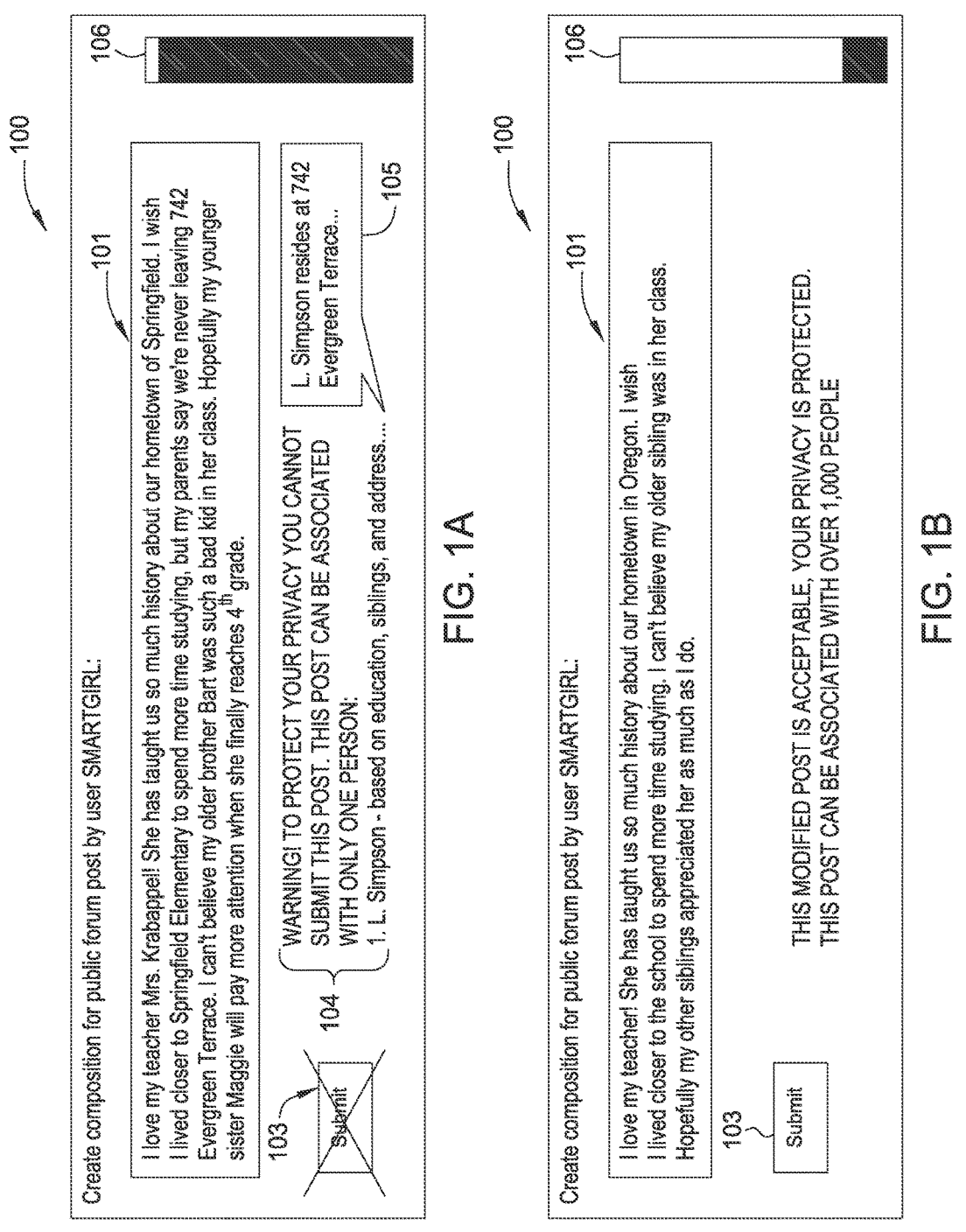

FIG. 1A illustrates techniques to protect privacy in an online setting, according to one embodiment. As shown, FIG. 1A depicts a graphical user interface (GUI) 100 that users can use to compose messages in a text field 101. Generally, users may type into the text field 101 and click the submit button 103 to publish the text online, such as in a public forum, online chat room, social media platform, and the like. As shown, a user "SMARTGIRL" has entered detailed text specifying, among other things, her address, the names of her siblings, and how much she enjoys learning from her teacher, Mrs. Krabappel. Because this information may reveal the SMARTGIRL's real life identity, the privacy manager disclosed herein may determine how many real-world people can be attributed to the post. As shown, the privacy manager has analyzed the text of the post, and has outputted a warning 104 to the user. The privacy manager has also disabled the submit button 103, which will prevent the user from submitting the post to the forum. The privacy manager has also provided a security meter 106 which shows the level of risk in submitting the text composition.

As shown, the warning 104 indicates that the user cannot submit the post due to the risk to her privacy. The warning 104 further indicates that the post can only be associated with one person, namely L. Simpson. The warning also provides the attributes that were relevant in resolving the username SMARTGIRL to a single person, in this example the education details, sibling information, and address in the text box 101. The popup box 105 is generated when the user hovers or clicks a mouse on each attribute, and shows, in this example, that L. Simpson lives at 742 Evergreen Terrace.

In one embodiment, the presence of other factors may cause the privacy manager to lessen the severity of a warning. For example, if other individuals were discovered with similar attributes over time, the privacy manager may lessen the severity of a warning. Similarly, if conflicting information is included in the user's history, the warning may be modified due to a lesser likelihood of divulging the identity of the user. For example, if a previous blog post by SMARTGIRL indicates she had no siblings, the privacy manager may take this into account when generating a warning. Further still, if content associated with a user is removed or modified, the privacy manager may remove the warning.

FIG. 1B depicts the GUI 100 after the privacy manager has modified the text in the text box 101 to reduce the risk to SMARTGIRL's privacy and safety. As shown, the privacy manager has removed information, added information, and modified information in the text, such that the post can now be associated with over 1,000 people. For example, the teacher's name has been removed, along with the names of the siblings. Similarly, the street address been removed. Further still, the hometown city of Springfield has now been replaced with the state of Oregon, which is one of many states that includes the city of Springfield. As another example, the hometown of Springfield may be changed to a different city the person lived in, such as New York. Without the specific attributes in FIG. 1A, the post can be associated with thousands of people, and therefore no longer poses a risk to the user. As shown, due to the lesser security risk, the security meter 106 is now at a lower level relative to the position in FIG. 1A. Similarly, the submit button 103 is now enabled, and the user can submit the post to the online forum.

FIG. 1C depicts a GUI 110 that provides online privacy checks for users. Through the GUI 110, a user may supply their email address, alias, or other user identifier in the input box 111. When the user clicks the submit button 112, the privacy manager may determine how many people can be associated with the submitted user ID. As shown, the privacy manager may return an indication of the user's privacy level, such as "high," "medium," or "low." The privacy level may be based on the number of possible names that may be associated with the user ID. For example, if only one result was returned, the privacy manager may output an indication of a "low" privacy level. The privacy manager may also return an ordered list of a subset of results. As shown, the privacy manager has returned the top 5 results (out of over 5,000 results) along with supporting evidence showing why the person can be associated with the input user ID. Therefore, as shown, a "L. Simpson" is the first result, which indicates "L. Simpson" is the person most likely to be associated with the user ID of SMARTGIRL. The privacy manager has also included evidence that was most impactful in matching L. Simpson to the user ID, in this case, the exemplary attributes of hometown, education history, and siblings.

FIG. 2 is a flow diagram 200 illustrating techniques to protect privacy in an online setting, according to one embodiment. Generally, the diagram 200 depicts a process implemented by the privacy manager to determine how many people can be associated with a user identifier, as well as actions that the privacy manager may trigger in response. As shown, at block 201, the privacy manager receives a user identifier (ID) (such as an email address, login, and the like). Continuing with the example from FIGS. 1A-1C, the user ID would be the username "SMARTGIRL." At block 202, the privacy manager may identify all publications known to have come from the input user ID. For example, the privacy manager may search online forums, product reviews, social media posts/comments, social media publications, or any type of published textual, audio, or video content associated with the input user ID. Generally, audio and/or video may be transcribed and annotated by a natural language processing (NLP) system to generate metadata and/or attributes of a person creating or appearing in the audio or video. Similarly, image processing techniques (such as facial recognition, text recognition) applied to photos or still images from a video may be used to recognize a person and extract attributes or metadata therefrom. In one embodiment, the data extracted at block 202 includes posts that are being composed for publication, such as the composition 101 in FIGS. 1A-1B.

At block 203, the privacy manager may extract attributes from the content identified at block 202. In at least one embodiment, the privacy manager may use natural language processing (NLP) techniques to extract the attributes from the content. The attributes may be personal attributes such as name, age, birthdate, gender, marital status, birthplace, education history, current address, address histories, and the like. Generally, the privacy manager may extract any number and type of attributes. An example set of attributes are depicted in block 204. The privacy manager may send one or more of the extracted attributes (and/or the passages of text from which the attributes were extracted, or an associated image or video) to a plurality of different identity services. Generally, an identity service is any online service that maintains a database of information related to people, and can return results based on an input query including one or more of the extracted attributes. As shown, for example, ID service 205 is a school record database that can return information about students based on age and education history as example input attributes. ID service 206, on the other hand, is a county marriage record service, which may receive marital status and location as example input attributes. ID service 207 represents any number and type of other ID services, such as telephone directories, family ancestry databases, and the like. The ID services may generally return as output a listing of people who match one or more of the attributes. The ID services may further specify a confidence that a given result is associated with the input user ID, and which, if any, attributes matched the person record (and to what degree).

In some embodiments, the identity services may return few results or no results at all. In such embodiments, the privacy manager may try to obtain identifying information from publicly available online sources on the web, which may generally be considered additional identity services. For example, a user identifier (such as email address, username, first name, last name, etc.) in the digital content identified at block 202 and/or the attributes extracted from the content at block 203 may be used to search the web for candidate identities that may be associated with the content or user attributes. The privacy manager may then process and score these candidate identities in the same way as candidate identities returned from the identity services.

At block 208, the privacy manager may intersect each result set from each ID service 205-207 to produce a set of candidate identities that were present in each result set returned from the ID services. In most cases, each ID service may return hundreds, if not thousands of records. Intersecting the sets of records may therefore eliminate many records and produce a more manageable data set, such as 25 candidate identities, as the case may be. At block 209, the privacy manager may use machine learning (ML) models or other logic/algorithms to compute a confidence score reflecting the likelihood that the input user ID is associated with a given identity in the candidate identities. For example, if the candidate identities include the names of 5 different people, the privacy manager would compute five different confidence scores, where each confidence score reflects the likelihood that the respective person is associated with the user ID. In addition, as reflected at block 210, the privacy manager may generate evidence for each confidence score based on the passages of text used by the identity services to match extracted attributes to a record in their respective databases. For example, each ID service may return an indication of an exact match between the attributes of address and gender. The privacy manager may then determine that the address and gender attributes were the most critical in identifying a person corresponding to the input user ID. As another example, the identity service may return an image of a person that matches a person in the image provided to the identity service with the initial search request. The supporting evidence may be presented to the user as part of a result list, such as the evidence depicted in FIG. 1A or 1C.

At block 211, the privacy manager may aggregate the results and produce an ordered list of candidate entities that are ranked according to their confidence scores. The list may also include the supporting evidence used to score each candidate entity. The privacy manager may then take any number of additional steps. If, for example, the user is composing a new message (similar to FIG. 1A), the privacy manager at block 212 may return to block 201 to re-iterate using the latest text data provided by the user (e.g., the composition 101). In doing so, the privacy manager may generate a new result list and compare the results to the previous set of results. For example, the previous set of results (from a first iteration) may include 200 candidate identities, or 200 people that may be creating the content associated with the input user ID. The second set of results, using the current input data, however, may narrow the list of candidate identities to 3 people. Such a dramatic reduction in the size of the list may indicate that the current composition poses a risk to the user's safety and privacy, and may output a warning, or take other steps to restrict publication of the current composition as depicted in FIG. 1A.

At block 213, the privacy manager may output a warning for the person's privacy level. Examples of such an indication are depicted in FIGS. 1A and 1C. The privacy manager may output the warning when a specified set of criteria are met. For example, if the aggregated result set generated at block 211 includes a number of candidate names (2, for example) that is below a threshold (5 names, for example), the warning may be triggered. Similarly, in another embodiment, if the result set based on a current composition reduces the previous result set (without the current composition) by a predefined percentage, the privacy manager may output the warning. At block 214, the privacy manager may output a current privacy level and/or an indication of a person associated with the input user ID. In at least one embodiment, such as the example depicted in FIG. 1C, a user may provide their own alias, email address, or other user ID to the privacy manager at block 201. The privacy manager may process the user ID according to the flow diagram 200 to produce an indication of the person's privacy level. The indication may be of any type, such as a numeric privacy score, or a privacy level. Similarly, the privacy manager may output a list of names that may own the user ID.

Figure 3:
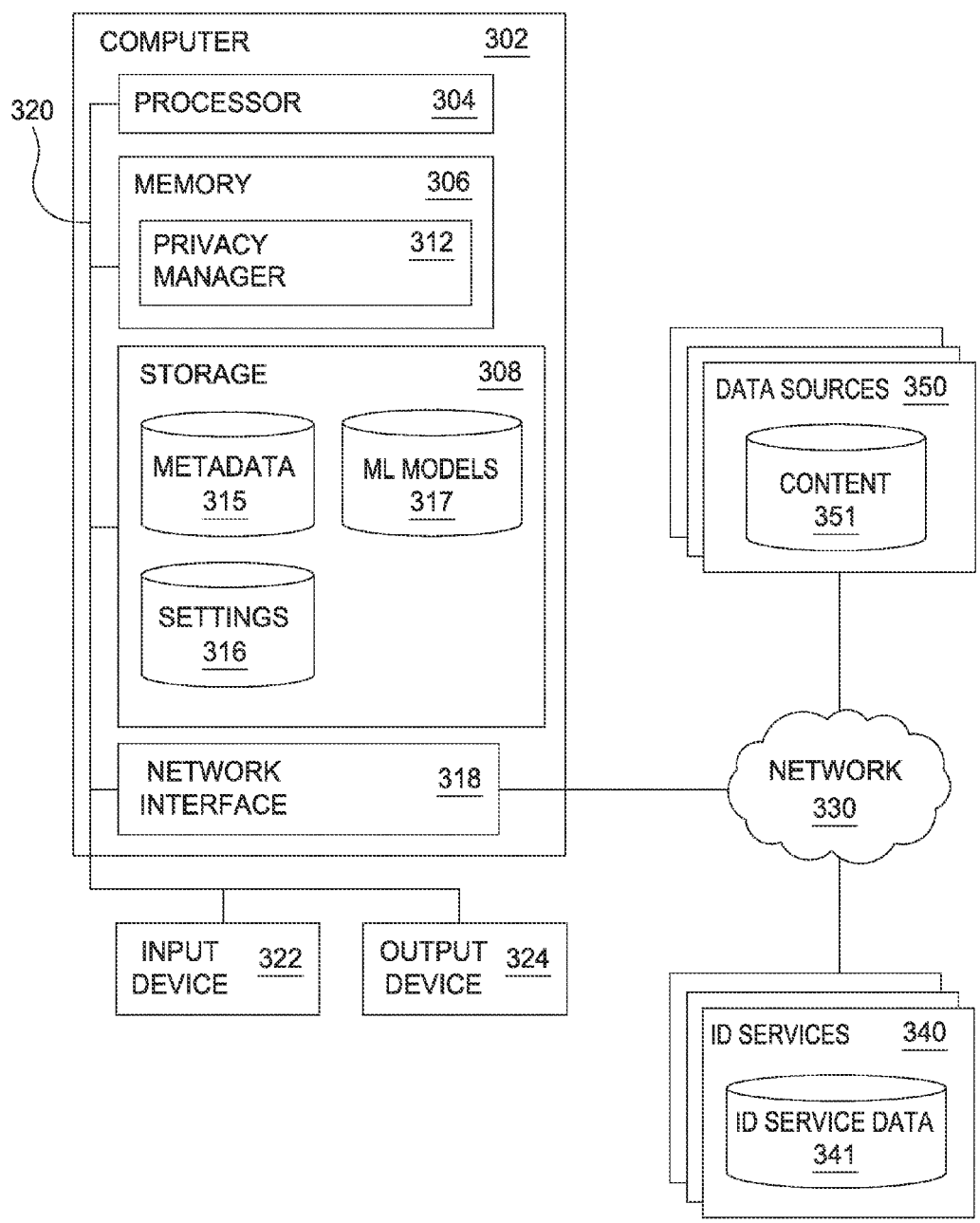
FIG. 3 is a block diagram illustrating a system configured to protect privacy in an online setting, according to one embodiment.

FIG. 3 is a block diagram illustrating a system 300 configured to protect privacy in an online setting, according to one embodiment. The networked system 300 includes a computer 302. The computer 302 may also be connected to other computers via a network 330. In general, the network 330 may be a telecommunications network and/or a wide area network (WAN). In a particular embodiment, the network 330 is the Internet.

The computer 302 generally includes a processor 304 which obtains instructions and data via a bus 320 from a memory 306 and/or a storage 308. The computer 302 may also include one or more network interface devices 318, input devices 322, and output devices 324 connected to the bus 320. The computer 302 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 304 is a programmable logic device that performs instruction, logic, and mathematical processing, and may be representative of one or more CPUs. The network interface device 318 may be any type of network communications device allowing the computer 302 to communicate with other computers via the network 330.

The storage 308 is representative of hard-disk drives, solid state drives, flash memory devices, optical media and the like. Generally, the storage 308 stores application programs and data for use by the computer 302. In addition, the memory 306 and the storage 308 may be considered to include memory physically located elsewhere; for example, on another computer coupled to the computer 302 via the bus 320.

The input device 322 may be any device for providing input to the computer 302. For example, a keyboard and/or a mouse may be used. The input device 322 represents a wide variety of input devices, including keyboards, mice, controllers, and so on. Furthermore, the input device 322 may include a set of buttons, switches or other physical device mechanisms for controlling the computer 302. The output device 324 may include output devices such as monitors, touch screen displays, and so on.

As shown, the memory 306 contains the privacy manager 312, which is generally configured to protect user privacy in online settings. The privacy manager 312 may generally perform any number of different operations to protect privacy, such as those described in FIGS. 1A-1B and 2. For example, if a person is about to post a comment on a social media platform that would allow malicious users to identify the person, the privacy manager 312 may restrict the comment from being posted, modify the post, send parents email alerts, and the like. Generally, by identifying all text publications associated with a user ID in the data sources 350, the privacy manager 312 may extract attributes from the text, query one or more ID services 340 to receive sets of matching records. The privacy manager 312 may then intersect the result sets from the ID services 340 to generate a list of candidate entities. The privacy manager 312 may then compute a confidence score for each candidate entity, where the confidence score reflects a likelihood that the candidate entity (a person) is associated with the user ID. The privacy manager 312 may also identify evidence to supplement the confidence scores, as described above. The privacy manager 312 may then aggregate the results to produce a ranked listing of candidate entities. Based on this algorithm, the privacy manager 312 may then generate any type of output, such as a warning, restriction, or the ranked listing with evidence (as depicted in FIG. 1A).

As shown, the storage 308 includes the metadata 315, settings 316, and models 317. The metadata 315 stores metadata attributes of each of a plurality of user IDs. The attributes may be any type of personal attribute, such as name, age, birthdate, gender, marital status, educational history, and the like. The settings 316 may include settings for the privacy manager 312, such as threshold numbers of results, which, if not exceeded, would generate warnings that personal security is at risk. The ML models 317 include machine learning (ML) models that the privacy manager 312 may use to compute confidence scores for each candidate identity. Generally, the machine learning models 317 specify weights for attributes or features, that are relevant in producing a confidence score for candidate identities. The ML models 317 may be adapted over time, if, for example, certain attributes are determined to be more relevant in producing an accurate confidence score. For example, a first ML model 317 may heavily weight the combination of zip code, birth date, and gender as relevant in correctly identifying a person. Therefore, if a candidate entity in the set of candidate entities has a birth date, zip code, and gender that matches those in the metadata 315 corresponding to the user ID, the first ML model 317 may produce a score indicating a high likelihood that the candidate entity is associated with the user ID.

As shown, the privacy manager 312 may access a plurality of data sources 350 via the network 330. The data sources 350 may be any type of data source that stores user content 351, such as forums, social media platforms, blogs, reviews, chat rooms, and the like. The ID services 340 are online services that can return information regarding people from their respective ID service data sets 341. Examples of ID services 340 include county marriage records, school records, real estate records, social media sites, and the like.

Figure 4:
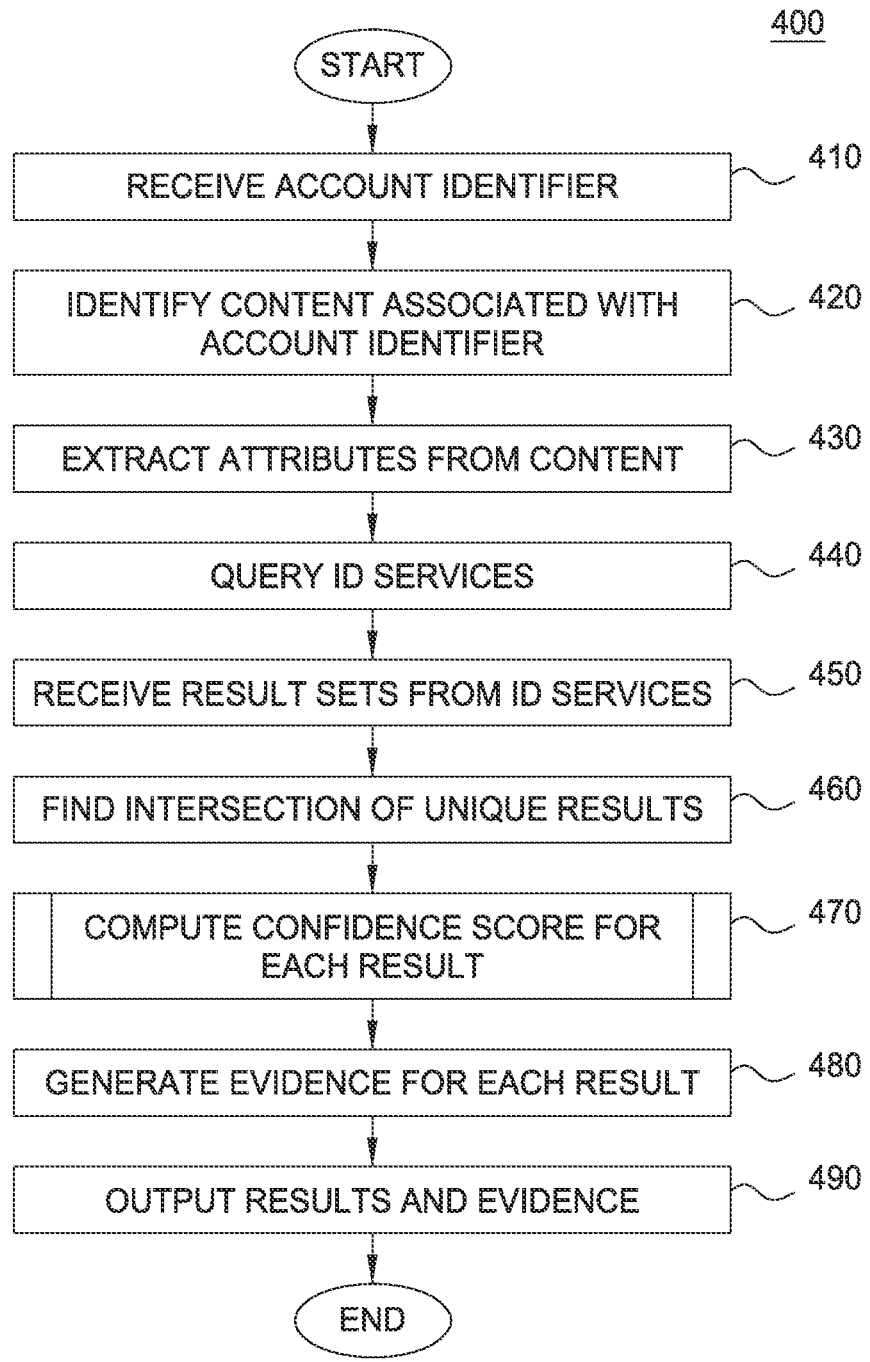
FIG. 4 is a flow chart illustrating a method to protect privacy in an online setting, according to one embodiment.

FIG. 4 is a flow chart illustrating a method 400 to protect privacy in an online setting, according to one embodiment. Generally, the privacy manager 312 may execute the steps of the method 400 responsive to a user request to determine the level of privacy (or anonymity) of their user ID. As shown, the method begins at step 410, where the privacy manager 312 may receive an account ID, such as an email address, account login name, and the like. At step 420, the privacy manager 312 may identify any content associated with the account ID received at step 410. For example, the privacy manager 312 may search the Internet for available content associated with the user ID in the content 351 of the data sources 350. At step 430, the privacy manager 312 may perform natural language processing to extract attributes from the identified content. For example, the privacy manager 312 may identify the gender, birth date, and other attributes in the content that may be associated with the person that created the content. At step 440, the privacy manager 312 may query the ID services 340 using the attributes extracted at step 430. The query may request as results any person records in the ID service data 341 matching the extracted attributes.

At step 450, the privacy manager 312 may receive result sets from each ID service 340. For example, a first ID service may return 10,000 possible matches, while a second ID service may return 15,000 possible matches, and a third ID service may return 20,000 possible matches. At step 460, the privacy manager 312 may determine an intersection of the result sets returned by the ID services 340 to produce a single set of unique results. For example, the privacy manager 312 may determine that of the 45,000 results returned by the three ID services, 5,000 results were unique (and members in each result set), thereby producing a set of candidate identities. In another embodiment, the privacy manager 312 may intersect the results using fuzzy-matching and thresholding. For example, a first ID service may return "John Smith" with a confidence of 10%, a second ID service may return "John A. Smith" with a confidence of 12%. In one embodiment, the privacy manager 312 may include a single entry for the "fuzzy-match" between "John Smith" and "John A. Smith" in the intersected result set (which may include a low confidence based on the confidences returned by the ID services). In another embodiment, the privacy manager 312 may discard the results due to their confidence scores being below a threshold (for example, 20%). Stated differently, therefore, the privacy manager 312 may consider whether a confidence score returned by the ID services 340 exceeds a threshold before including a given result in the intersection of result sets. At step 470, the privacy manager 312 may compute a confidence score for each result in the set of candidate identities (or a subset thereof). Generally, the privacy manager 312 may use ML models 317 or other algorithms to score the candidate identities, where the score reflects a likelihood that the candidate identity is the owner of the input user ID. One example method to compute a confidence score is described with reference to FIG. 6, however, any suitable algorithm may be applied. At step 480, the privacy manager 312 may generate evidence for each result in the set of candidate identities. For example, all three ID services may indicate that person X is the most likely match to the provided attributes based on gender, birth date, and address, the privacy manager 312 may determine that gender, birth date, and address are the most influential pieces of evidence when computing the confidence score, and return these items as supporting evidence with a result set. At step 490, the privacy manager 312 may output an ordered list of results (such as the results depicted in FIG. 1C) along with items of supporting evidence.

Figure 5:
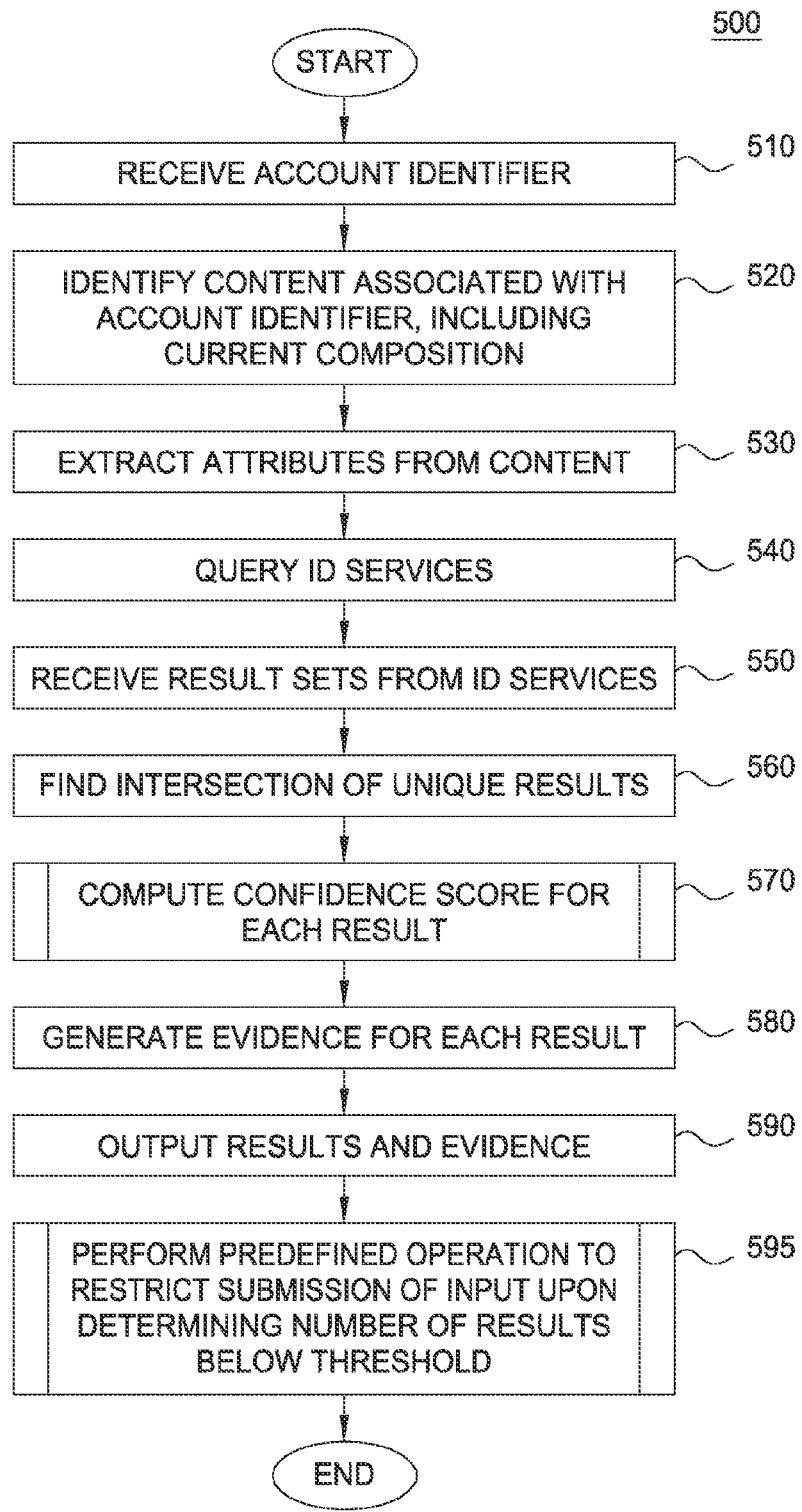
FIG. 5 is a flow chart illustrating a method to protect privacy in an online setting, according to one embodiment.

FIG. 5 is a flow chart illustrating a method 500 to protect privacy in an online setting, according to one embodiment. Generally, the privacy manager 312 may implement the steps of the method 500 to prevent users from divulging information that may jeopardize their privacy. As shown, the method 500 begins at step 510, where the privacy manager 312 may receive an account ID, such as an email address, account login names, and the like. At step 520, the privacy manager 312 may identify any content associated with the account ID received at step 510. The content may include a current composition that the user is preparing to submit for online publication, such as the content in box 101 of FIG. 1A. As previously described, the privacy manager 312 may also search the Internet for available content associated with the user ID in the content 351 of the data sources 350. For example, the privacy manager 312 may find blog posts, product reviews, social media posts, and the like that are associated with the input user ID. At step 530, the privacy manager 312 may perform natural language processing to extract attributes from the identified content. For example, the privacy manager 312 may identify the gender, birth date, and other attributes in the content that may be associated with the person that created the content. At step 540, the privacy manager 312 may query the ID services 340 using the attributes extracted at step 530. The query may request as results any person records in the ID service data 341 matching the extracted attributes.

At step 550, the privacy manager 312 may receive result sets from each ID service 340. For example, a first ID service may return 10,000 possible matches, while a second ID service may return 15,000 possible matches, and a third ID service may return 20,000 possible matches. At step 560, the privacy manager 312 may determine an intersection of the result sets returned by the ID services 340 to produce a single set of unique results. For example, the privacy manager 312 may determine that of the 45,000 results returned by the three ID services, 5,000 results were unique (and common to each result set), thereby producing a set of candidate identities. At step 570, the privacy manager 312 may compute a confidence score for each result in the set of candidate identities (or a subset thereof). Generally, the privacy manager 312 may use ML models 317 or other algorithms to score the candidate identities, where the score reflects a likelihood that the candidate identity is associated with the input user ID. One example method to compute a confidence score is described with reference to FIG. 6, however, any suitable algorithm may be applied. At step 580, the privacy manager 312 may generate evidence for each result in the set of candidate identities. For example, all three ID services may indicate that person Y is the most likely match to the provided attributes based on gender, birth date, and address, the privacy manager 312 may determine that gender, birth date, and address are the most influential pieces of evidence when computing the confidence score, and return these items as supporting evidence with a result set. At step 590, the privacy manager 312 may output an ordered list of results (such as the results depicted in FIG. 1A or 1C) along with items of supporting evidence.

At step 595, the privacy manager 312 may perform a predefined operation to restrict submission of input upon determining that the number of results is below a predefined threshold. For example, if 10 results is the threshold, and the privacy manager 312 determines that four people are in the list of candidate entities, the privacy manager 312 may restrict submission of content that the user is composing. In one embodiment, the privacy manager 312 performs the predefined operation upon determining that a change in the number of results based on the input exceeds a threshold. For example, a record in the metadata 315 may indicate that 1,000 people can be associated with a specific email address. However, after iterating through the method 500 using input the user is composing for online publication, the privacy manager 312 may determine that only 7 people can be associated with the email address if the new input is considered. Therefore, due to this significant change (either based on percentage or number of results), the privacy manager 312 may restrict submission of the new content.

Figure 6:
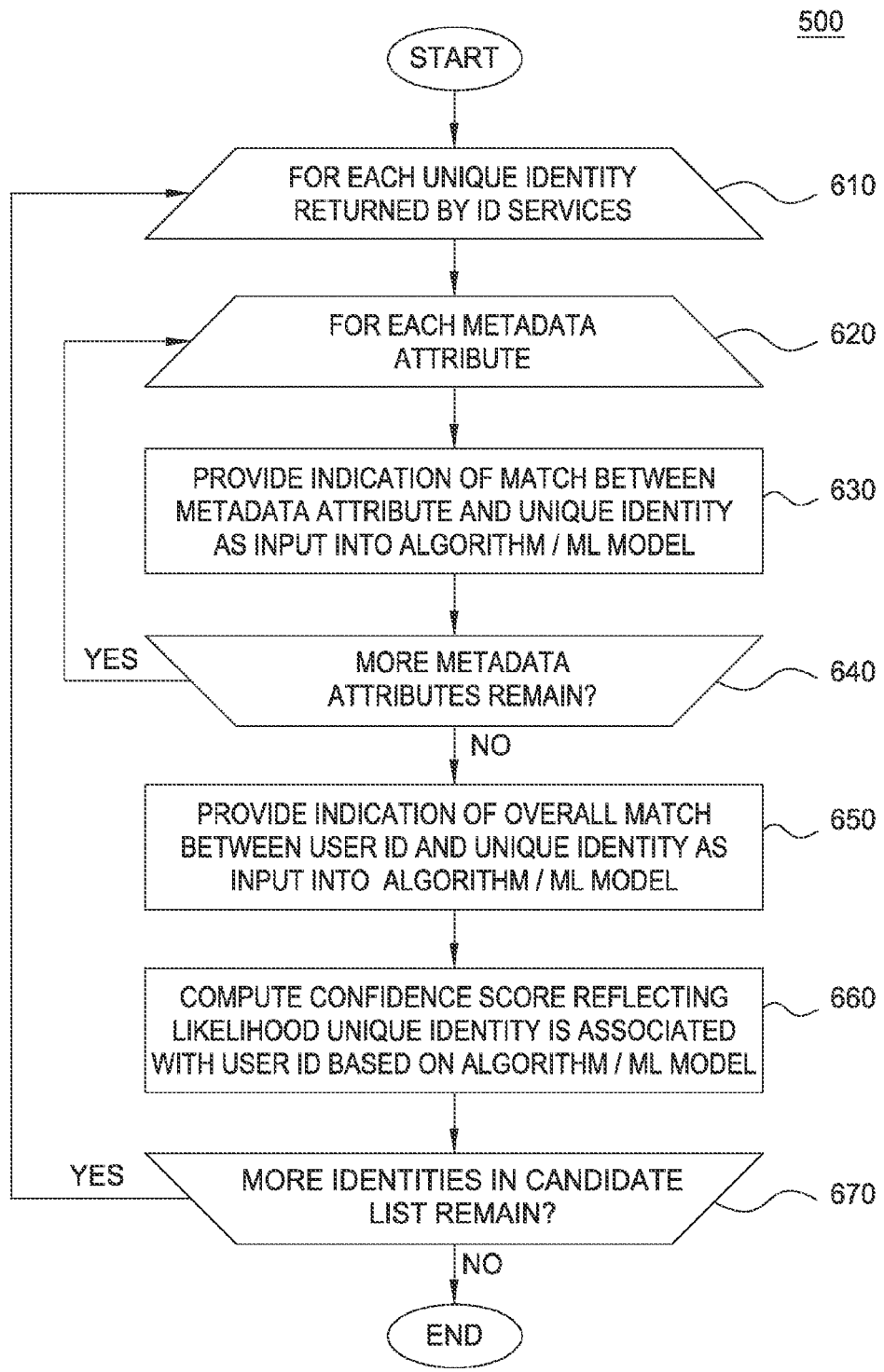
FIG. 6 is a flow chart illustrating a method 500 to compute a confidence score for a plurality of unique results, according to one embodiment.

FIG. 6 is a flow chart illustrating a method 600 to compute a confidence score for a plurality of unique results, according to one embodiment. As shown, the method 600 begins at step 610, where the privacy manager 312 executes a loop including steps 620-670 for each unique identity in the candidate list of identities returned by the ID services 340. At step 620, the privacy manager 312 executes a loop including steps 630-640 for each metadata attribute specified as matching (to any degree) the attributes of records in the ID service data 341. For example, the metadata attributes extracted from content using NLP techniques may indicate the person associated with a user ID lives in New York City and is 50 years old. A first ID service may return person X as being an 80% match for living in New York City (possibly because the person lives in Brooklyn), and a 90% match on age because person X is known to be within the age range of 49-50. Similarly, the extracted metadata may indicate that the person associated with the user ID is female, while person X is a male. The privacy manager 312 may then provide these attributes, whether they match, and their corresponding percentages as input into an algorithm or ML model 317 at step 630. At step 640, the privacy manager 312 determines whether any additional metadata attributes remain. If additional metadata attributes remain, the privacy manager 312 returns to step 620. Otherwise, the privacy manager 312 proceeds to step 650. At step 650, the privacy manager 312 may provide an indication of an overall match between the user ID and a record as input to an algorithm or ML model. For example, the ID services 340 may also return an overall score indicating how well a given record matches to the provided attributes (and therefore the user ID). For example, record 1 may have an 85% overall match to a user ID, while record 2 may have a 50% overall match to the user ID. These values may be inputted to the ML models 317 and/or the algorithms. At step 660, the privacy manager 312 may compute a confidence score reflecting the likelihood that the unique identity in the candidate list of entities is associated with the user ID based on the input provided to the algorithm and/or ML models 317 at steps 630 and 650. At step 670, the privacy manager 312 may determine whether more identities remain in the candidate list of entities. If more identities remain, the privacy manager 312 returns to step 610 to compute a confidence score for the remaining identities. Otherwise, the method 600 ends.

Figure 7:
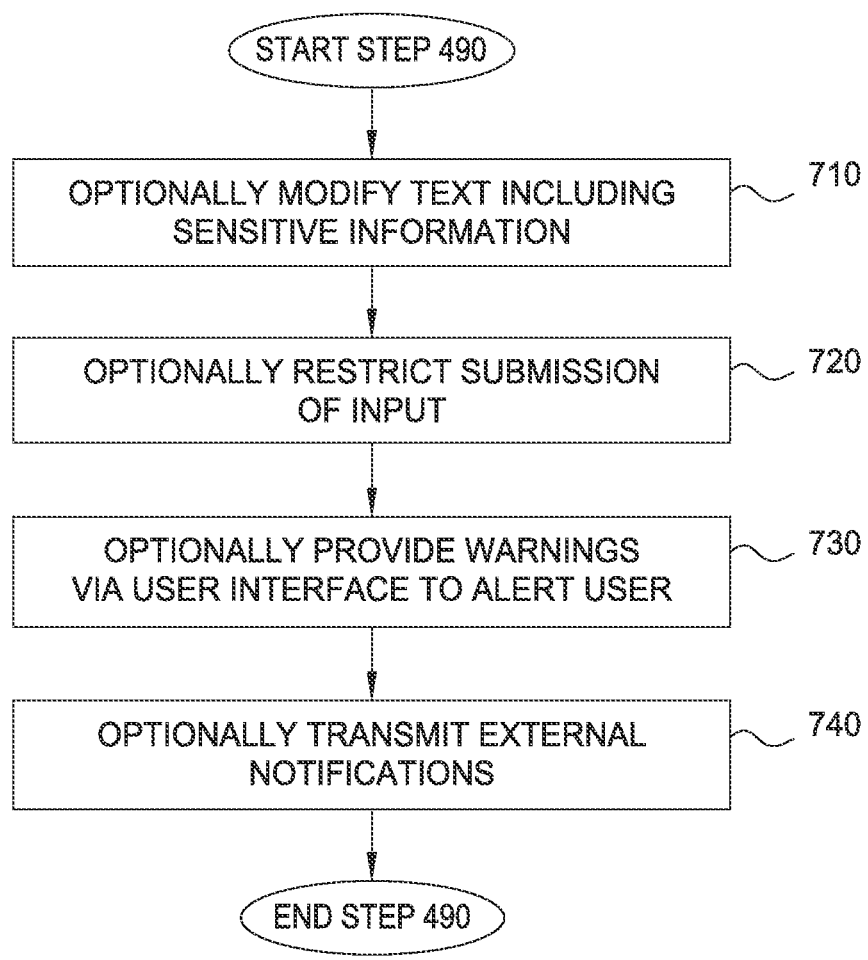
FIG. 7 is a flow chart illustrating a method to perform a predefined operation to restrict submission of input, according to one embodiment.

FIG. 7 is a flow chart illustrating a method 700 to perform a predefined operation to restrict submission of input, according to one embodiment. Generally, the privacy manager 312 may implement any number and type of operations to restrict submission of input that could jeopardize a user's privacy in online settings. As shown, the method 700 begins at step 710, where the privacy manager 312 may optionally modify text that includes sensitive information. For example, if a user included their social security number in a blog post, the privacy manager 312 may remove the social security number, blur out the social security number, add a false social security number (such as one with 15 digits) and the like. At step 720, the privacy manager 312 may optionally restrict submission of input by the user. For example, the privacy manager 312 may disable submit buttons, disable network connections, and the like. At step 730, the privacy manager 312 may optionally provide warnings via a user interface to alert the user. Examples of such warnings are depicted in FIG. 1A. At step 740, the privacy manager 312 may optionally transmit an external notification, such as an email alert or a smartphone alert to a parent when their child is attempting to post content that may jeopardize their privacy.

Advantageously, embodiments disclosed herein provide techniques to help people from divulging information that may jeopardize their privacy. For example, users may be restricted from posting content that may uniquely identify them on the Internet. Similarly, users can query the privacy manager to determine their current privacy level, where the privacy level is based on the number of unique people (zero to potentially billions) that can be associated with a given user ID.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the privacy manager 312 could execute on a computing system in the cloud and compute a privacy level for a given user ID. In such a case, the privacy manager could store the privacy level at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving digital content associated with an account identifier;
parsing the digital content and extracting a set of attributes from the digital content;
receiving via a network connection, from each of a plurality of online identity services, a set of identities matching at least one attribute of the set of attributes;
intersecting the sets of identities to create a first set of candidate identities;
computing, by a machine learning (ML) model executing on one or more computer processors, a score for each identity in the first set of candidate identities based on the matched at least one attribute of the respective candidate identity, wherein each score reflects a likelihood that the respective candidate identity is associated with the account identifier;
for each identity in the first set of candidate identities:
generating at least one item of evidence for each score based on at least one text passage including the matched at least one attribute returned by the respective identity service;
returning a ranked list of the scored first set of candidate identities and an indication of the at least one item of evidence linking the respective candidate identity to the account identifier;
determining that a number of identities in the first set of candidate identities is below a threshold;
disabling submission of the digital content including the first item of evidence to restrict online publication of a first item of evidence;
receiving input modifying the digital content;
generating a second set of candidate identities generated based on the modified digital content; and
outputting a privacy level associated with the second set of candidate identities.

2. The method of claim 1, wherein the privacy level is a first priority level of a plurality of privacy levels, wherein the first privacy level is different than a second privacy level determined based on the first set of candidate identities, wherein the digital content is received as part of a current composition for online publication, wherein the first item of evidence is generated for a first identity in the first set of candidate identities, wherein the computed score for the first candidate identity is greater than the remaining scores computed for the other candidate identities in the first set of candidate identities, the method further comprising:
determining that the at least one item of evidence is included in the current composition.

3. The method of claim 2, wherein modifying the digital content comprises at least one of: (i) adding information to the current composition, (ii) removing information from the current composition, (iii) removing the first item of evidence.

4. The method of claim 3, wherein receiving the digital content comprises searching for a plurality of publications associated with the account identifier accessible on the Internet, wherein the set of attributes are extracted from the received digital content using natural language processing (NLP) algorithms, the method further comprising:
querying the plurality of identity services using the extracted set of attributes.

5. The method of claim 4, wherein the set of attributes comprise attributes of a person associated with the account identifier, wherein the added information includes false attributes that are not of the attributes of the person associated with the account identifier, wherein the attributes of the person comprise one or more of: (i) a gender, (ii) a current address, (iii) a race, (iv) a nationality, (v) a birth date, (vi) a marital status, (vii) a number of siblings, (viii) a education history, (ix) an address history, and (x) at least a portion of a name of the person, wherein the first item of evidence comprises a composite attribute of the person, wherein the composite attribute comprises two or more of the attributes of the person, wherein the ML model specifies a weight for each of a plurality of items of evidence, wherein the weight for each of the plurality of items of evidence is used to compute the score for each of the plurality of candidate identities in the first set of candidate identities based on whether the matched at least one attribute of the respective candidate identity includes the composite attribute, wherein the ML model specifies a first weight for the first item of evidence, the method further comprising:
determining that the first item of evidence, when present in the set of attributes, causes the ML model to generate a greater score that is greater than a score generated by the ML model without the first item of evidence present in the attributes; and increasing the first weight for the first item of evidence in the ML model.

6. The method of claim 5, wherein the account identifier comprises one of: (i) an email address, (ii) an account login identifier, and (iii) an alias, the method further comprising:
receiving the account identifier as input, wherein the received account identifier is used to receive the digital content from the Internet.

7. The method of claim 6, wherein the first and second sets of candidate identities comprise names of people.

8. A system, comprising:
one or more computer processors; and
a memory containing a program which when executed by the processors performs an operation comprising:
receiving digital content associated with an account identifier;
parsing the digital content and extracting a set of attributes from the digital content;
receiving via a network connection, from each of a plurality of online identity services, a set of identities matching at least one attribute of the set of attributes;
intersecting the sets of identities to create a first set of candidate identities;
computing, by a machine learning (ML) model executing on one or more computer processors, a score for each identity in the first set of candidate identities based on the matched at least one attribute of the respective candidate identity, wherein each score reflects a likelihood that the respective candidate identity is associated with the account identifier;
for each identity in the first set of candidate identities:
generating at least one item of evidence for each score based on at least one text passage including the matched at least one attribute returned by the respective identity service;
returning a ranked list of the scored first set of candidate identities and an indication of the at least one item of evidence linking the respective candidate identity to the account identifier;
determining that a number of identities in the first set of candidate identities is below a threshold;
disabling submission of the digital content including the first item of evidence to restrict online publication of a first item of evidence;
receiving input modifying the digital content;
generating a second set of candidate identities generated based on the modified digital content; and
outputting a privacy level associated with the second set of candidate identities.

9. The system of claim 8, wherein the privacy level is a first priority level of a plurality of privacy levels, wherein the first privacy level is different than a second privacy level determined based on the first set of candidate identities, wherein the digital content is received as part of a current composition for online publication, wherein the first item of evidence is generated for a first identity in the first set of candidate identities, wherein the computed score for the first candidate identity is greater than the remaining scores computed for the other candidate identities in the first set of candidate identities, the operation further comprising:
determining that the at least one item of evidence is included in the current composition.

10. The system of claim 9, wherein modifying the digital content comprises at least one of: (i) adding information to the current composition, (ii) removing information from the current composition, (iii) removing the first item of evidence.

11. The system of claim 10, wherein receiving the digital content comprises searching for a plurality of publications associated with the account identifier accessible on the Internet, wherein the set of attributes are extracted from the received digital content using natural language processing (NLP) algorithms, the operation further comprising:
querying the identity service using the extracted set of attributes.

12. The system of claim 11, wherein the set of attributes comprise attributes of a person associated with the account identifier, wherein the added information includes false attributes that are not of the attributes of the person associated with the account identifier, wherein the attributes of the person comprise one or more of: (i) a gender, (ii) a current address, (iii) a race, (iv) a nationality, (v) a birth date, (vi) a marital status, (vii) a number of siblings, (viii) a education history, (ix) an address history, and (x) at least a portion of a name of the person, wherein the first item of evidence comprises a composite attribute of the person, wherein the composite attribute comprises two or more of the attributes of the person, wherein the ML model specifies a weight for each of a plurality of items of evidence, wherein the weight for each of the plurality of items of evidence is used to compute the score for each of the plurality of candidate identities in the first set of candidate identities based on whether the matched at least one attribute of the respective candidate identity includes the composite attribute, wherein the ML model specifies a first weight for the first item of evidence, the operation further comprising:
determining that the first item of evidence, when present in the set of attributes, causes the ML model to generate a greater score that is greater than a score generated by the ML model without the first item of evidence present in the attributes; and
increasing the first weight for the first item of evidence in the ML model.

13. The system of claim 12, wherein the account identifier comprises one of: (i) an email address, (ii) an account login identifier, and (iii) an alias, the operation further comprising:
receiving the account identifier as input, wherein the received account identifier is used to receive the digital content from the Internet.

14. The system of claim 13, wherein the first and second sets of candidate identities comprise names of people.

15. A computer program product, comprising:
a non-transitory computer-readable storage medium having computer-readable program code embodied therewith, the computer-readable program code executable by a computer processor to perform an operation comprising:
receiving digital content associated with an account identifier;
parsing the digital content and extracting a set of attributes from the digital content;
receiving via a network connection, from each of a plurality of online identity services, a set of identities matching at least one attribute of the set of attributes;
intersecting the sets of identities to create a first set of candidate identities;
computing, by a machine learning (ML) model executing on one or more computer processors, a score for each identity in the first set of candidate identities based on the matched at least one attribute of the respective candidate identity, wherein each score reflects a likelihood that the respective candidate identity is associated with the account identifier;

for each identity in the first set of candidate identities: generating at least one item of evidence for each score based on at least one text passage including the matched at least one attribute returned by the respective identity service;

returning a ranked list of the scored first set of candidate identities and an indication of the at least one item of evidence linking the respective candidate identity to the account identifier;

determining that a number of identities in the first set of candidate identities is below a threshold;

disabling submission of the digital content including the first item of evidence to restrict online publication of a first item of evidence;

receiving input modifying the digital content;

generating a second set of candidate identities generated based on the modified digital content; and outputting a privacy level associated with the second set of candidate identities.

16. The computer program product of claim 15, wherein the privacy level is a first priority level of a plurality of privacy levels, wherein the first privacy level is different than a second privacy level determined based on the first set of candidate identities, wherein the digital content is received as part of a current composition for online publication, wherein the first item of evidence is generated for a first identity in the first set of candidate identities, wherein the computed score for the first candidate identity is greater than the remaining scores computed for the other candidate identities in the first set of candidate identities, the operation further comprising:

determining that the at least one item of evidence is included in the current composition.

17. The computer program product of claim 16, wherein modifying the digital content comprises at least one of: (i) adding information to the current composition, (ii) removing information from the current composition, (iii) removing the first item of evidence.

18. The computer program product of claim 17, wherein receiving the digital content comprises searching for a plurality of publications associated with the account identifier accessible on the Internet, wherein the set of attributes are extracted from the received digital content using natural language processing (NLP) algorithms, the operation further comprising:

querying the identity service using the extracted set of attributes.

19. The computer program product of claim 18, wherein the set of attributes comprise attributes of a person associated with the account identifier, wherein the added information includes false attributes that are not of the attributes of the person associated with the account identifier, wherein the attributes of the person comprise one or more of: (i) a gender, (ii) a current address, (iii) a race, (iv) a nationality, (v) a birth date, (vi) a marital status, (vii) a number of siblings, (viii) a education history, (ix) an address history, and (x) at least a portion of a name of the person, wherein the first item of evidence comprises a composite attribute of the person, wherein the composite attribute comprises two or more of the attributes of the person, wherein the ML model specifies a weight for each of a plurality of items of evidence, wherein the weight for each of the plurality of items of evidence is used to compute the score for each of the plurality of candidate identities in the first set of candidate identities based on whether the matched at least one attribute of the respective candidate identity includes the composite attribute, wherein the ML model specifies a first weight for the first item of evidence, the operation further comprising:

determining that the first item of evidence, when present in the set of attributes, causes the ML model to generate a greater score that is greater than a score generated by the ML model without the first item of evidence present in the attributes; and increasing the first weight for the first item of evidence in the ML model.

20. The computer program product of claim 19, wherein the first and second sets of candidate identities comprise names of people, wherein the account identifier comprises one of: (i) an email address, (ii) an account login identifier, and (iii) an alias, the operation further comprising:

receiving the account identifier as input, wherein the received account identifier is used to receive the digital content from the Internet.

* * * * *